(12) United States Patent
Ronkko et al.

(10) Patent No.: US 7,580,736 B2
(45) Date of Patent: Aug. 25, 2009

(54) PIVOT DISPLAY

(75) Inventors: Antti Ronkko, Espoo (FI); Ilpo Kauhaniemi, Vantaa (FI); Sami Saila, Halikko (FI); Vesa J. Moilanen, Suomusjarvi (FI)

(73) Assignee: Nokia Corporation, Espoo, FL (US)

( * ) Notice: Subject to any disclaimer, the term of this patent is extended or adjusted under 35 U.S.C. 154(b) by 76 days.

(21) Appl. No.: 11/754,588

(22) Filed: May 29, 2007

(65) Prior Publication Data

US 2008/0299804 A1 Dec. 4, 2008

(51) Int. Cl.
 *H04M 1/00* (2006.01)
(52) U.S. Cl. .................................. 455/575.3
(58) Field of Classification Search ................. 439/162, 439/11, 13; 455/556.1, 575.1, 575.3, 575.4; 379/433.12, 433.13
See application file for complete search history.

(56) References Cited

U.S. PATENT DOCUMENTS

| | | | |
|---|---|---|---|
| 6,850,784 B2 * | 2/2005 | SanGiovanni | 455/575.1 |
| 7,047,053 B2 * | 5/2006 | Lee | 455/575.3 |
| 7,174,195 B2 * | 2/2007 | Nagamine | 455/575.1 |
| 7,200,429 B2 * | 4/2007 | Park et al. | 455/575.4 |
| 7,333,840 B2 * | 2/2008 | Heikkinen | 455/575.3 |
| 7,353,049 B2 * | 4/2008 | Mizuta | 455/575.3 |
| 2003/0078069 A1 * | 4/2003 | Lindeman | 455/550 |
| 2007/0293283 A1 * | 12/2007 | Inubushi et al. | 455/575.1 |

* cited by examiner

*Primary Examiner*—Neil Abrams
(74) *Attorney, Agent, or Firm*—Perman & Green, LLP

(57) ABSTRACT

A mobile electronic device including two planar panels that are typically suspended from one another and can assume a retracted position in which they substantially overlap one another and assume an extended position in which the panels do not completely overlap one another. In the extended position an additional portion of the elements of the user interface is exposed.

21 Claims, 8 Drawing Sheets

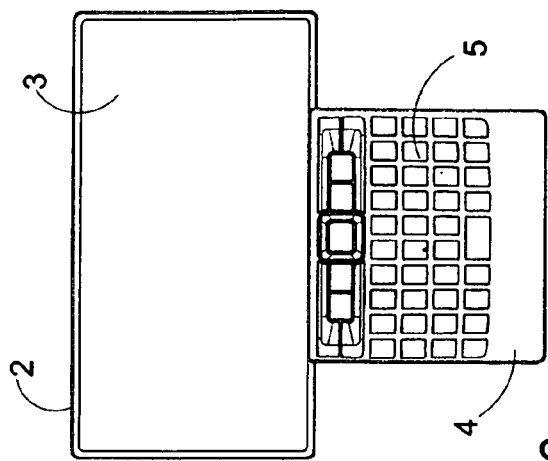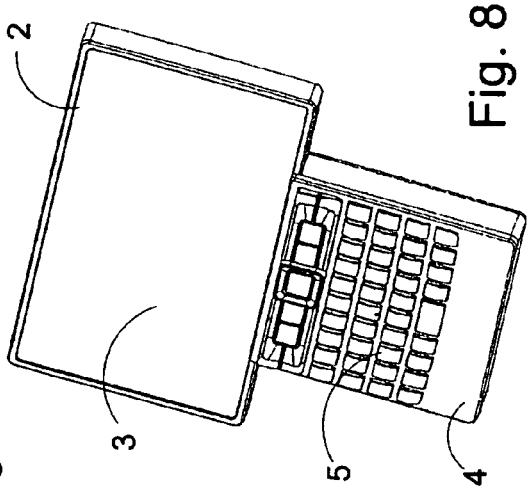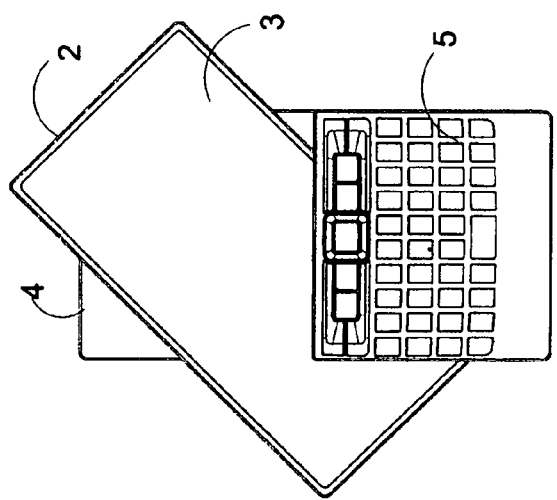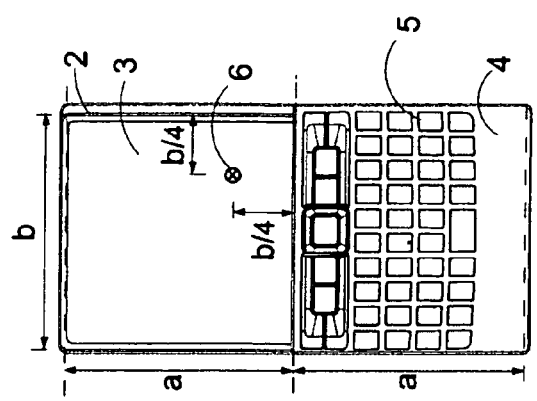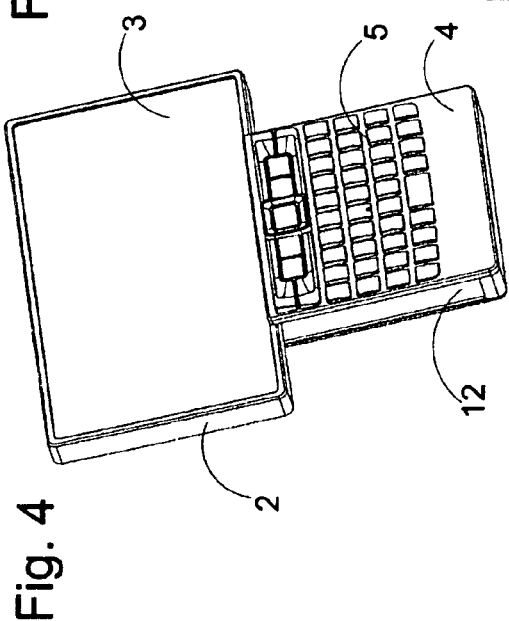

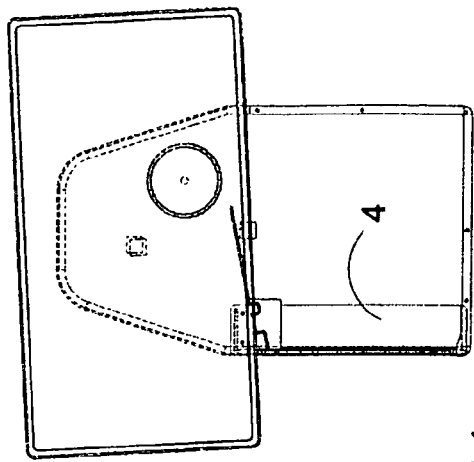
Fig. 11
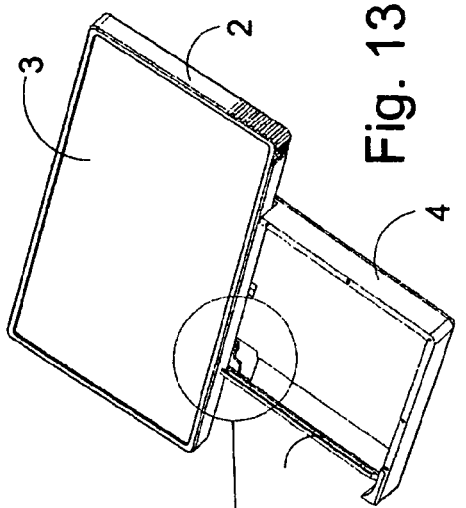
Fig. 13
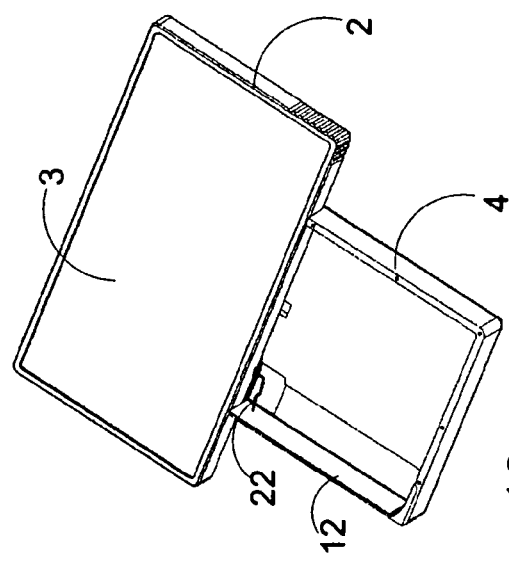
Fig. 10
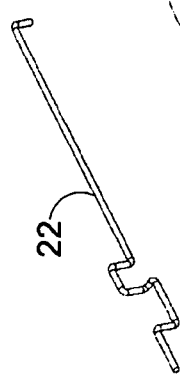
Fig. 12
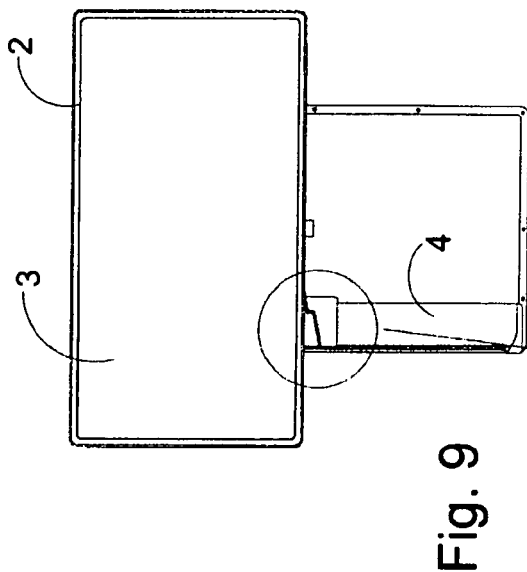
Fig. 9
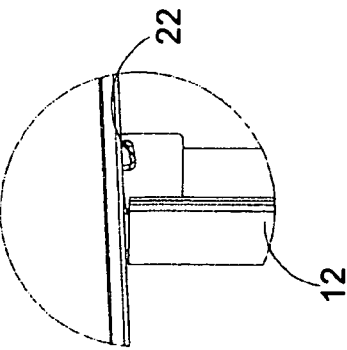

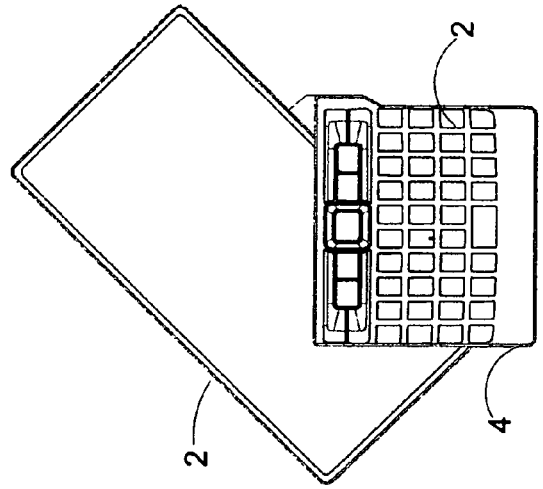
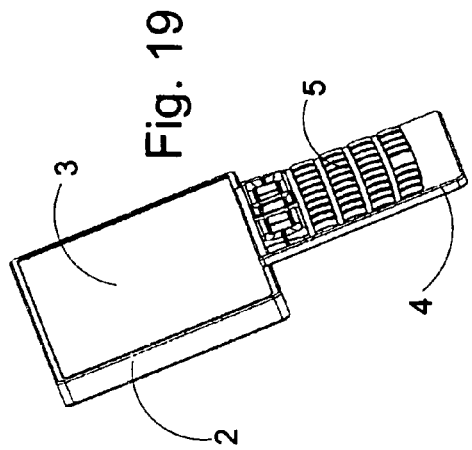
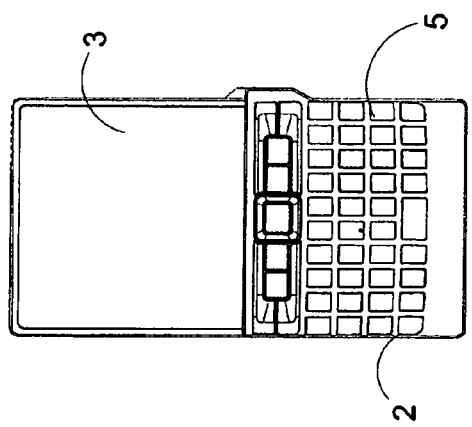
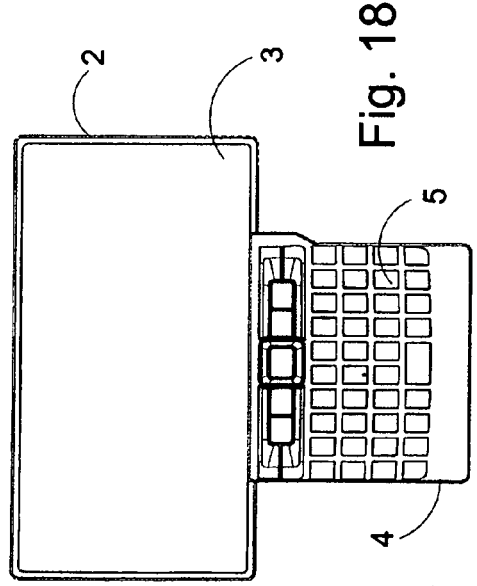
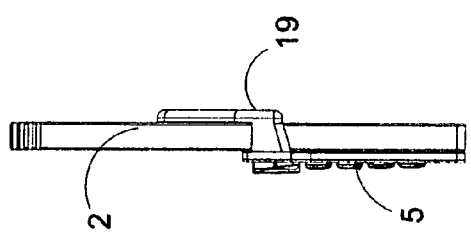
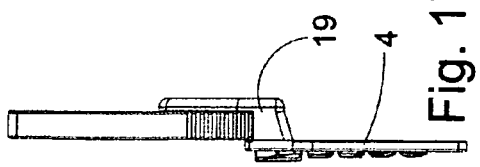

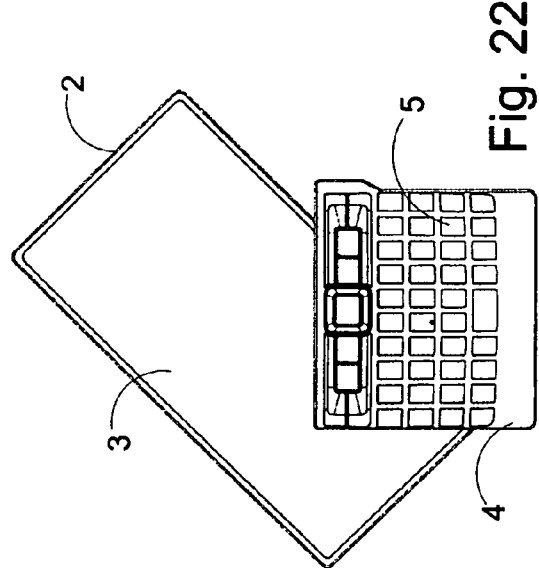
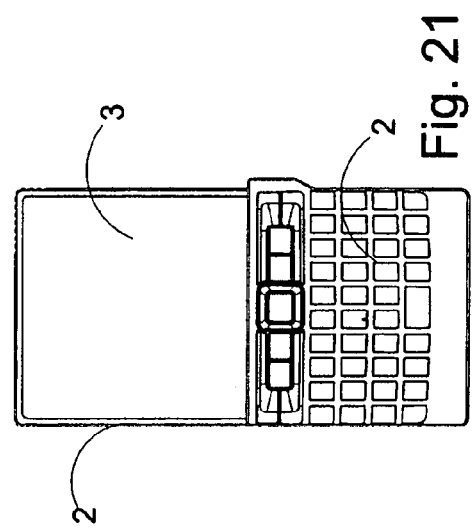
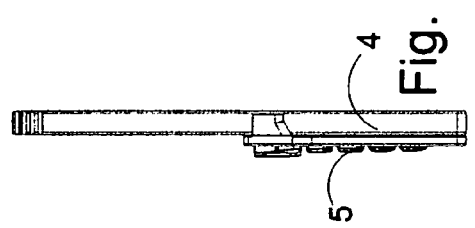
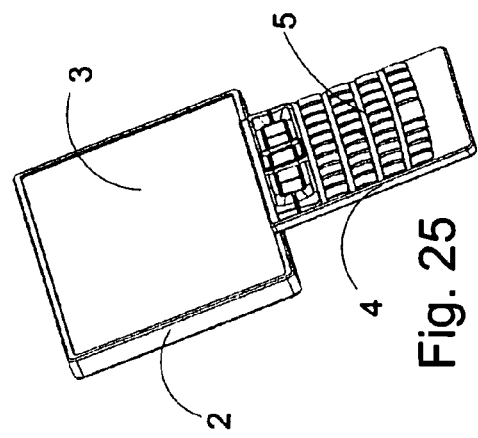
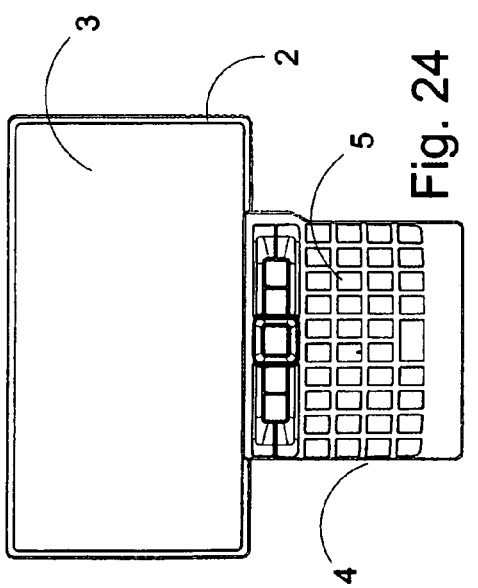
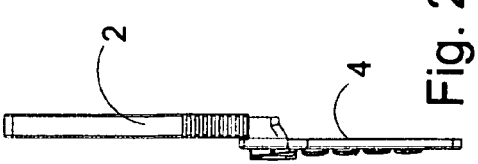

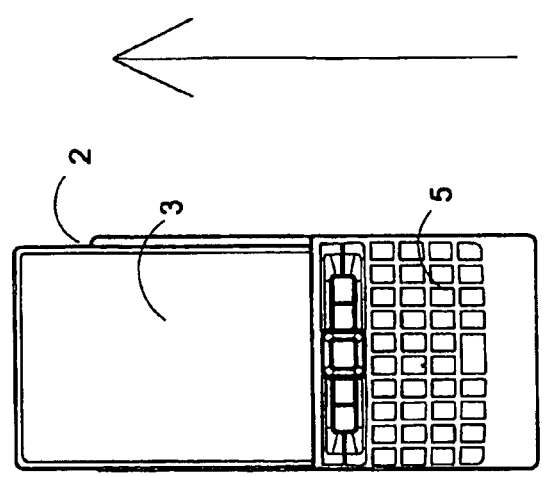
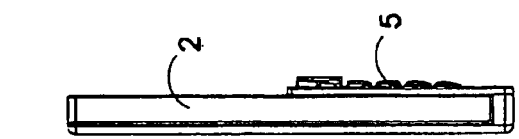
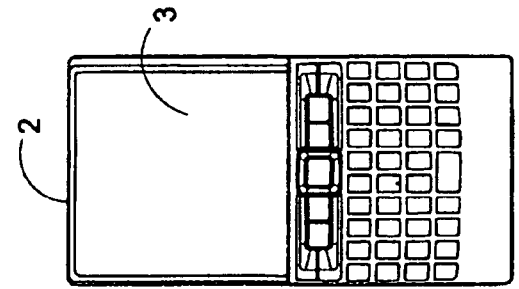
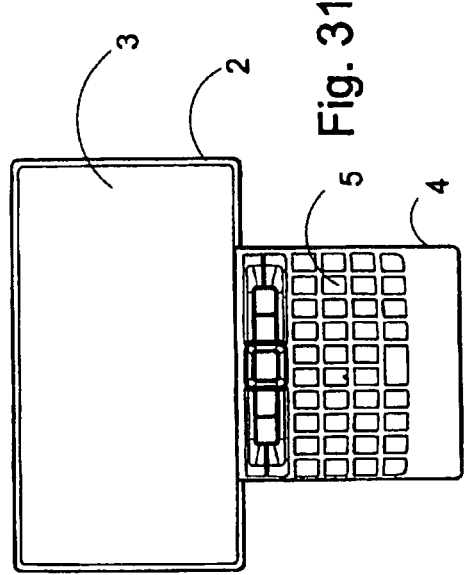

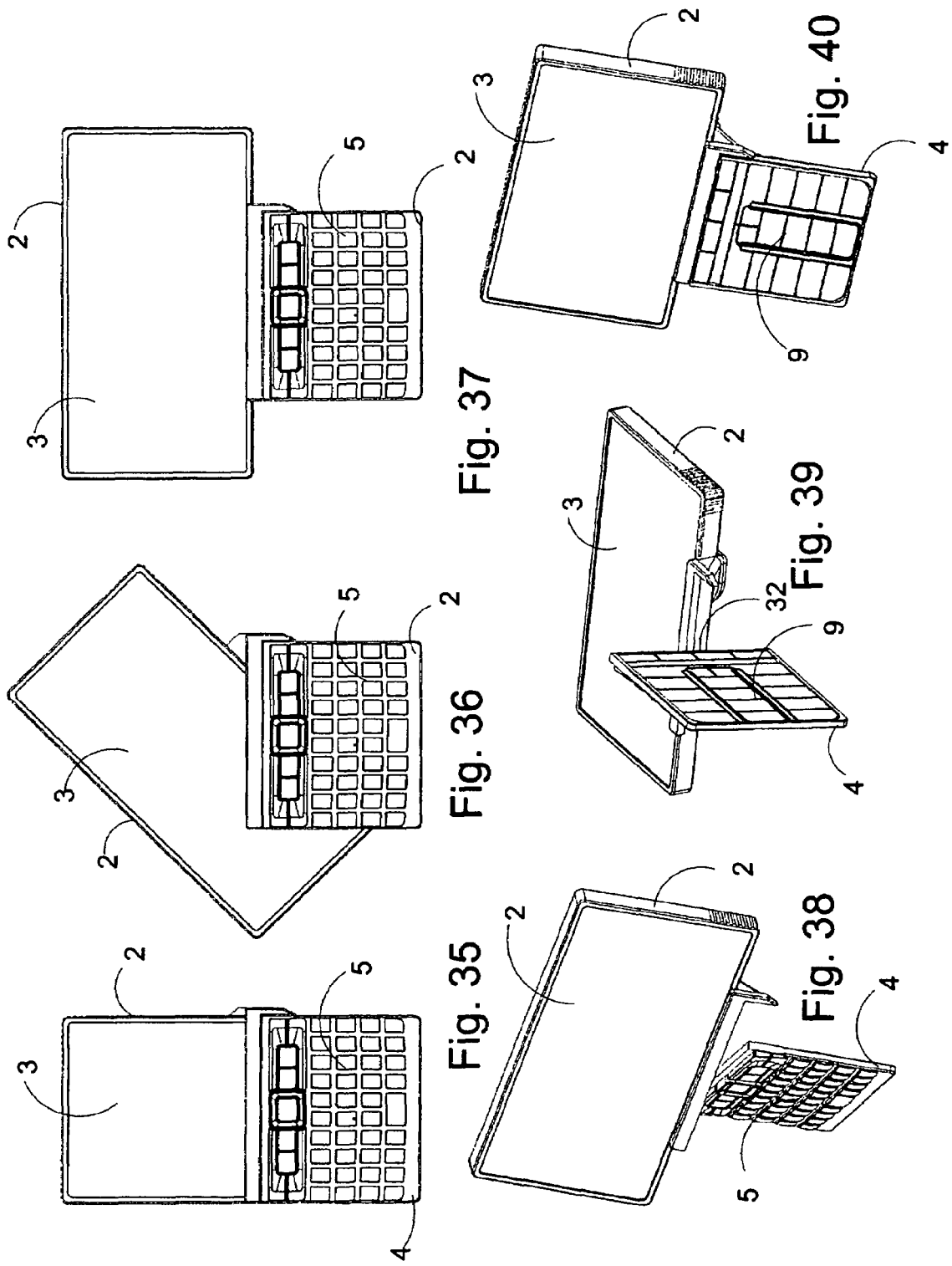

PIVOT DISPLAY

FIELD

The disclosed embodiments relates to mobile electronic devices, in particular to mobile electronic devices with a housing that includes two connected planar panels that can rotate relative to one another in the plane of the panels.

BACKGROUND

Various electronic mobile devices that have two planar panels that are arranged movable relative to one another are known. There are for example the well-known slide phones that include two often substantially rectangular panels that can be slid between an open and a closed position. In the closed position the front panel typically completely obscures the rear panel. In the open position the rear panel at least partially uncovers a portion of the rear panel and typically a keypad becomes accessible. Other well-known devices are those of the so-called fold type in which a simple hinge connects the two panels at one of their short ends allowing the device to open and close like a clamshell. Yet another known type of mobile electronic device includes two planar panels that are pivotally connected to one another and can rotate relative to one another in the plane of the panels. In these devices the rear panel is usually completely obscured by the front panel in a closed position and with the pivot axis typically positioned near one of the short sides of the panels, a substantially L-shaped device is obtained with a 90° rotation of the panels and an elongated device is obtained with a 180° rotation.

Each of these types of devices has its own pros and cons. One of the advantages of all of these devices is that they enable a portion of the user interface to be obscured and thereby protect it. This can for example be useful when a keypad should not be inadvertently activated when the device is not in use, i.e. when it's placed in a bag or in a pocket.

An advantage of all these devices is that they are relatively compact in their retracted or closed position. However, neither of these devices has been able to provide a compact device that allows a Qwerty keypad to be effectively combined with a landscape widescreen display screen.

DISCLOSURE OF THE INVENTION

On this background, the aspects of the disclosed embodiment to provide a mobile electronic device referred to initially, which overcomes or at least reduces the drawbacks indicated above.

This can be achieved by providing a mobile electronic device comprising a housing having at least a first substantially planar panel and a second substantially planar panel, said first panel having an outline with a width and a height, said second panel having an outline with a width and a height, said second panel being arranged substantially parallel to said first housing part and disposed on or under the first panel, and said first panel and said second panel are hingeably connected to one another so that the panels can rotate relative to one another in a plane in which both panels are arranged between a retracted position in which the outline along the width of the first panel substantially coincides with the outline of the width of the second panel, and an extended position that is reached by a substantially 90° rotation of the first panel relative to the second panel in which the outline of the first panel along one side of its width substantially coincides with the position of the outline along one side of its height when the first panel is in the retracted position.

This arrangement of the panels ensures that they substantially completely overlap one another in the retracted position, whereas the first panel is positioned relative to the second panel in a symmetrical position with the overall height of the device not changing when the position of the panels is changed. Further, the construction enables a portion of one of the panels to be obscured in the retracted position and to be uncovered in the extended position.

Preferably, the outline along one side of the height of the second panel substantially coincides with the outline along the height of the first panel when said panels are in the retracted position.

There can be a ratio of substantially 1:2 between the width and the height of said first panel. Thus, it ensured that the overall height of the device remains unchanged between the extended and retracted position.

Preferably, the panels rotate relative to one another about a pivot point that is disposed on a straight line that coincides with a first point in the middle on one side of the outline along the width of the first panel and extends to a hypothetical or non-hypothetical corner on the other side of the first panel.

The pivot point can be placed along said line at a position that is approximately at a distance in the direction of the width of the first panel corresponding to a quarter of the width of the first panel as measured from the side of the first panel at which said point is placed.

The first panel can have a front face provided with elements of a user interface, and said second panel can have a front surface that is provided with elements of a user interface.

Preferably, at least a portion of the elements of the user interface on one of the two panels is obscured in the retracted position and wherein said portion of the elements of the user interface is not obscured in the extended position.

The second panel can be a double walled panel with a space therebetween in which a portion of the first panel is received in the retracted position.

One side of said double walled panel can be provided with a flap that opens and closes for allowing the portion of the first panel to receive the second panel and for closing of the hollow space inside the second panel when said portion of said first panel is not received inside said second panel. Thus, the risk of ingress of dirt into the hollow space can be reduced.

Preferably, the flap is urged to its closed position by a spring, preferably a torsion spring.

The second panel can be provided with a QWERTY type keyboard.

The second panel can also be suspended so as to be able to swivel relative to the first panel, so that both sides of the second panel can one at a time act as the front surface of the second panel. In this case, the second panel on both of its sides is provided with elements of a user interface. For example, one side of said second panel can be provided with a first type of keypad and the other side of said second panel can be provided with another type of keypad.

The first panel can be suspended from the second panel by a link mechanism.

The first panel may include a substantially rectangular display screen that makes up the major portion of the front surface of the first panel.

A portion of the display screen can be obscured by the second panel when the panels are in the retracted position. The obscured portion of the display screen is deactivated for saving power.

It is another object of the invention to provide a method for placing a pivot axis that connects a first substantially planar panel and a second substantially planar panel of a housing of a mobile electronic device, said first panel having an outline with a width and a height, and said second panel having an outline with a width and a height, said pivot axis connecting said first panel and said second panel to one another so that the panels can be rotated relative to one another in a plane in which both panels are arranged between a retracted position and an extended position that are separated by a substantially 90° rotation of the first panel relative to the second panel, the pivot axis being placed such that the width of the first panel substantially coincides with the width of the second panel in the retracted position, whilst one side of the first panel is substantially aligned with the top of the second panel in the extended position of the panels.

Further objects, features, advantages and properties of the mobile electronic device according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which:

FIG. 4 is a front view of a mobile electronic device according to another embodiment of the invention in a retracted position, FIG. 5 is the electronic device shown in FIG. 4 in an intermediate position, FIG. 6 is a front view of the device shown in FIG. 4 in an extended position FIG. 7 is an elevated view of the electronic device shown in FIG. 4 in an extended position, FIG. 8 is another elevated view of the device shown in FIG. 1 in the extended position FIG. 9 is a worked open front view of the device shown in FIG. 4, FIG. 10 is a worked open elevated view of the device shown in FIG. 6, FIG. 11 is a semi-transparent front view of the device shown in FIG. 6, FIG. 12 is an elevated view of a resilient element of the device shown in FIG. 6, FIG. 13 is an elevated to a worked open view of the device shown in FIG. 6, FIG. 14 is a side view of a mobile electronic device according to another embodiment of the invention, FIG. 15 is a front view of the mobile electronic device shown in FIG. 14 in a retracted position, FIG. 16 is the front view of the mobile electronic device shown in FIG. 14 in an intermediate position, FIG. 17 is a side view of the mobile electronic device shown in FIG. 14 in an extended position, FIG. 18 is a front view of the mobile electronic device shown in FIG. 14 in an extended position, FIG. 19 is an elevated view of the mobile electronic device shown in FIG. 14 in an extended position, FIG. 20 is a side view of a mobile electronic device according to another embodiment of the invention, FIG. 21 is a front view of the mobile electronic device shown in FIG. 20 in a retracted position, FIG. 22 is the front view of the mobile electronic device shown in FIG. 20 in an intermediate position, FIG. 23 is a side view of the mobile electronic device shown in FIG. 20 in an extended position, FIG. 24 is a front view of the mobile electronic device shown in FIG. 20 in an extended position, FIG. 25 is an elevated view of the mobile electronic device shown in FIG. 20 in an extended position, FIG. 26 is a front view of a mobile electronic device according to another embodiment of the invention, FIG. 27 is a side view of the mobile electronic device shown in FIG. 26, FIG. 28 is a front view of the mobile electronic device shown in FIG. 26th in an intermediate position, FIG. 29 is a side view of the mobile electronic device shown in FIG. 27, FIG. 30 is a front view of the mobile electronic device shown in FIG. 27 in an intermediate position, FIG. 31 is a front view of the mobile electronic device shown in FIG. 26 in an extended position, FIG. 35 is a front view of a mobile electronic device according to another embodiment of the invention, FIG. 36 is a front view of the mobile electronic device shown in FIG. 35 in an intermediate position, FIG. 37 is a front view of the mobile electronic device shown in FIG. 35 in an extended position, FIG. 38 is an elevated view of the mobile electronic device shown in FIG. 35 in an extended position with one of its panels at the start of a swiveling movement, FIG. 39 is an elevated view of the mobile electronic device shown in FIG. 35 in an extended position with one of its panels in the middle of a swiveling movement, and FIG. 40 is an elevated view of the mobile electronic device shown in FIG. 35 in an extended position with one of its panels at the end of a swiveling movement.

DETAILED DESCRIPTION OF PREFERRED EMBODIMENTS

In the following detailed description, a mobile electronic device according to the invention in the form of mobile phone will be described by the preferred embodiments.

Figure 3:
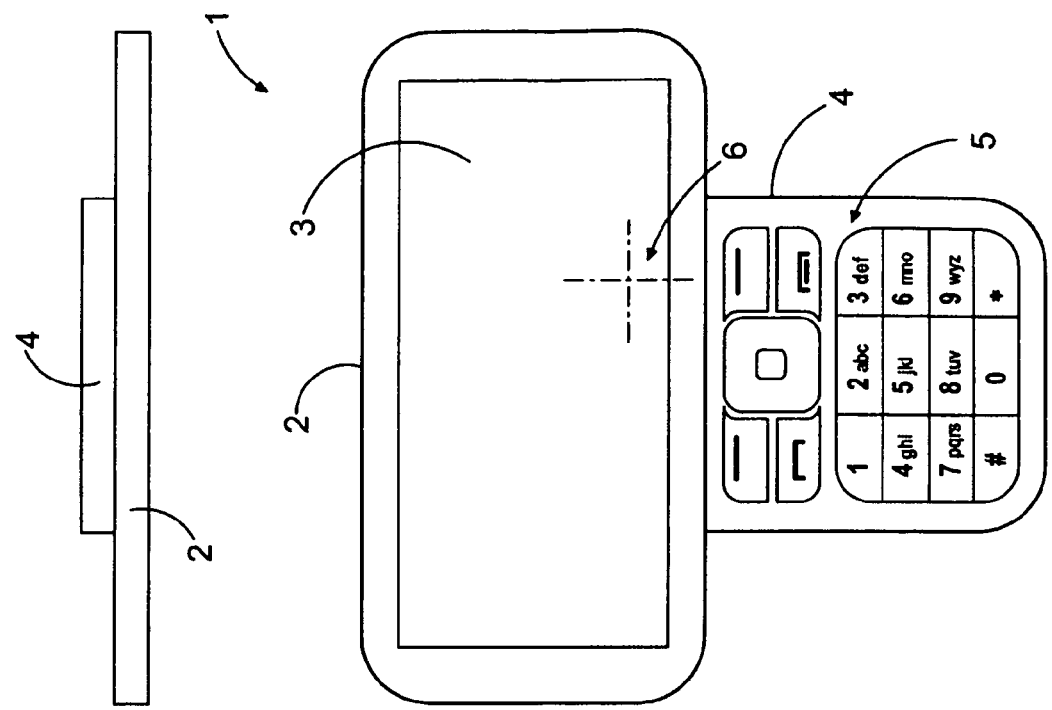
FIG. 3 is a front view and a top view of the device shown in FIG. 1 in an extended position.
Figure 2:
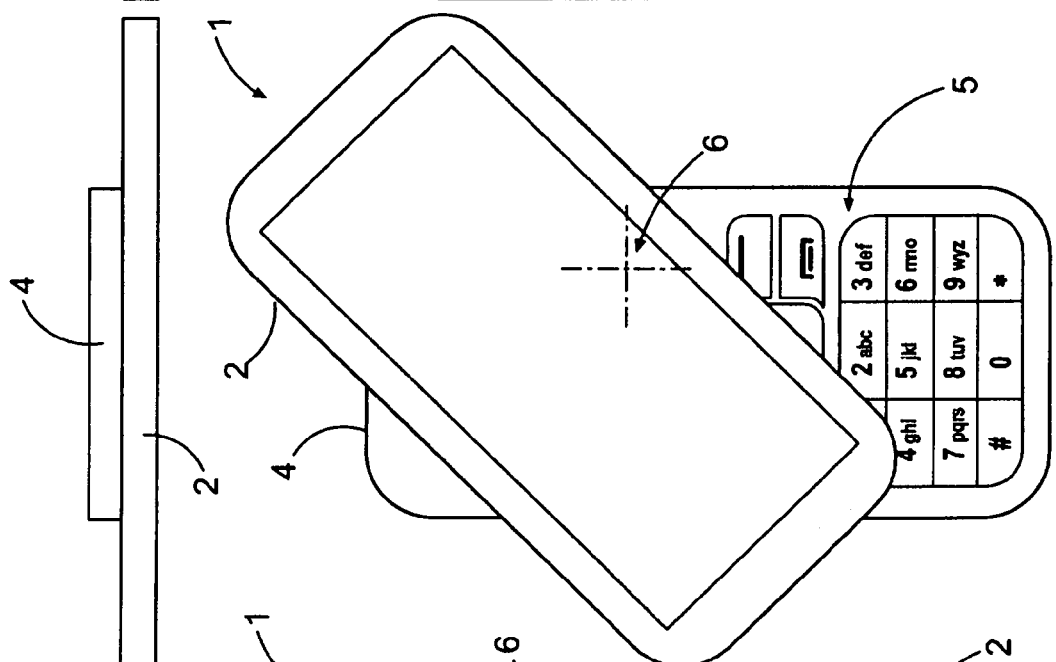
FIG. 2 is a front view and a top view of the device shown in FIG. 1, in an intermediate position.
Figure 1:
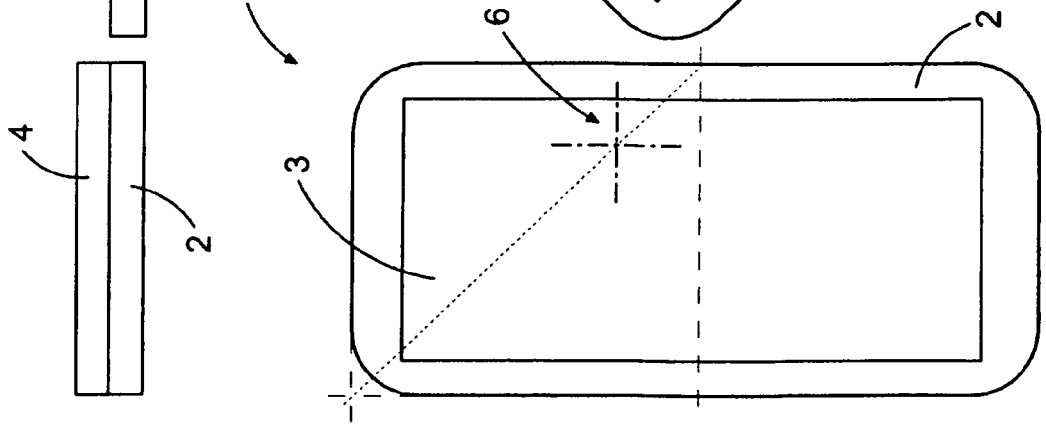
FIG. 1 is a front view and a top view of a mobile electronic device according to the invention in a retracted position.

FIGS. 1 to 3 illustrates a first embodiment. The mobile electronic device 1 is configured as a mobile phone by way of example. The mobile electronic device might just as well be a palmtop computer, a media player, a camera or a navigation device.

The device 1 includes a front panel 2 and a rear panel 4. In this embodiment the panels are substantially planar and have a substantially rectangular outline, although this is not a requirement for the disclosed embodiment.

The front and rear panels 3,4 are suspended from one another and can rotate about a pivot axis 6 that extends substantially transverse to the plane of the panels 2,4. The panels 2,4 can pivot about the pivot axis 6 from a retracted position shown in FIG. 1 via an intermediate position shown in FIG. 2 to an extended position shown in FIG. 3. The user pushes the panels 2,4 from the retracted position to be extended position and visa versa.

A spring-loaded mechanism (not shown) may urge the panels towards one of the two extreme positions, possibly in combination with user releasable lock (not shown) in the opposite position. Alternatively, a bi-stable resilient mechanism (not shown) urges the panels 2,4 from a neutral intermediate position towards both the extreme positions as soon as the panels 2,4 are moved out of the neutral intermediate position.

The front surface of the front panel 2 is provided with an LCD display screen 3. A touchscreen may in an embodiment overlay the LCD display screen 3. The front panel may further include an ear speaker (not shown).

The rear panel 4 includes a keypad 5 and a microphone (not shown). In this embodiment a keypad 5 is a standard ITU-T keypad combined with two soft keys, a navigation key, an on-hook and an off-hook key, i.e. a typical mobile phone keypad.

The front panel 2 and the rear panel 4 have a substantially identical outline, so that they fit substantially exactly on top of one another, as shown in FIG. 1. The front and rear panel may have different thicknesses.

In the retracted position the keypad 5 on the rear panel 4 is covered and inadverted keystrokes are unlikely to happen when the mobile electronic device 1 is in the retracted position. In the extended position the keypad 5 is accessible for the user and at the same time the large LCD display screen 3 is in a favorable landscape orientation that allows optimal use in connection with for example editing text, playing games, Internet browsing, etc. The portrait orientation is advantageous in that it allows for a compact and easy to hold shape, e.g. for touchscreen operation.

The position of the pivot axis 6 has been carefully selected, so that the front panel 2 exactly overlaps the rear panel 4 in the retracted position, whilst the front panel 2 is exactly aligned with the top of the rear panel 4 in the extended position of the panels. The overall height of the mobile phone 1 is therefore the same in the extended position as in the retracted position. This is obtained by placing the pivot axis 6 on an imaginary straight line that extends from a point in the middle of one of the long sides of the front panel 2, i.e. in the middle of one of the sides along the width of the front panel 2 to the opposite upper corner of the front panel 2. If the front panel does not have a sharp corner and the imaginary line will expand to a position on a corner of an imaginary rectangle that best fits the outline of the front panel 2.

Any position of the pivot axis 6 along this imaginary straight line will result in the height of the device remaining unchanged when the position of the panels is changed between the retracted and the extended position.

The end positions of the panels can be secured mechanically or with magnets (not shown). The rotation movement of the panels may in an embodiment be dampened by low level friction.

FIGS. 4 to 8 illustrate another embodiment of the invention that is very similar to the first embodiment, except that the rear panel 4 is over a portion of its length a double walled panel. The double portion in the lower part of the rear panel 4 is provided with a cavity between the double walls for receiving a portion of the front panel 2 therein. In the retracted position a portion of the display screen 3 is obscured. The obscured portion of the display screen 3 can with an OLED screen be deactivated for saving power. The (retracted) portrait orientation is advantageous in that it allows for a compact and easy to hold shape, e.g. for mobile phone operation. The landscape (extended) position allows for more extensive text editing, TV viewing, internet browsing and other applications that profit from a large landscape orientations display.

FIG. 4 shows the mobile electronic device 1 in the retracted position. In this position approximately half of the front panel is received in the cavity between the double walled portion of the rear panel 4. Consequently, half of the front face of the front panel 2 is covered by the double walled portion of the rear panel 4. The front surface of the double walled portion of the rear panel 4 is provided with a Qwerty a type keyboard 5. The keyboard 5 is also provided with a navigation key and with a number of soft keys and a number of dedicated hard keys.

The front panel 2 and the rear panel 4 have a nearly identical rectangular outline with a width "b" and a height of twice "a". The pivot axis 6 about which the panels 2,4 can rotate relative to one another is placed at a distance "b/4" from one of the long sides of the front panel 2, i.e. the distance between the pivot axis 6 and the side of the compound 2 is a quarter of the width of the front panel 2. The pivot axis 6 is also placed at a distance "b/4" from an imaginary line through the middle of the height of the front panel 2. This position ensures that—when the outline of the front panel 2 and the rear panel 4 are substantially identical and overlapping in the retracted position—the front panel 2 will in the extended position be aligned with the top of the rear panel 4, with the front panel 2 being placed centrally relative to the rear panel so that the outline of the mobile electronic device 1 has a symmetrical T-shape in the extended position.

When the height of the front panel 2 corresponds to twice the width of the front panel 2, i.e. "a" equals "b", the pivot axis 6 as placed in accordance with the present embodiment also coincides with the imaginary straight line defined in the previous embodiment.

The shape of the outline of the panels 2,4 does not need to correspond closely to that of a rectangle in order to be able to position the pivot axis 6 correctly. The correct position of the pivot axis is determined relative to an imaginary rectangular outline inside which the actual outline of the panels fits.

As such shown in FIG. 7, the double walled portion of the rear panel 4 is provided with a retractable flap 12 that opens when the front panel 2 is to be received in the cavity within the double walled portion of the rear panel 4 and closes after the front panel 2 when the latter has been released from the cavity within the double walled portion of the rear panel 4. The retractable flap 12 prevents ingress of dirt or other undesirable material into the cavity inside the double walled portion of the rear panel 4.

FIGS. 9 through 13 illustrate the construction of the retractable flap 12 and the mechanism that controls its operation. The flap 12 is hingeably connected to the rear panel 4 along one of the sides of the rear panel. A spring (not shown) urges the flap 12 to its retracted position. A small cap (not shown) between the front panel and the edge of the flap 12 facilitates the functioning of the retractable flap 12.

A torsion spring 22 with a specially shaped proximate end forces the retractable flap 12 to its extended (closed) position and has a force that is higher than that of the spring that urges the retractable flap 12 to its retracted position. The proximate end of the torsion spring 22 has a shape that stays under the retractable flap 12 when the panels 2,4 are not in the extended position. In the extended position the proximate end of the torsion spring 12 moves up behind the retractable flap 12 to force it to its extended position in which it closes off access to the cavity inside the double walled portion of the rear panel 4. Rotation of the front panel controls the position of the torsion spring 22. Thus, when the user rotates the front panel 2 from the extended position towards the retracted position, interaction between the side of the front panel 2 and the torsion spring forces the torsion spring 22 down against its spring force and vice versa. Thereby, the torsion spring no longer acts on the retractable flap 12 and the spring that urges the retractable flap 12 to its retracted position moves it to its retracted position thereby opening the flap 12. The spring mechanism that moves the retractable flap 12 to its retracted (and opened) position may be based on a screw mechanism that is operated by a small displacement of the retractable flap 12 along its pivot axis. The movement along the pivot axis is spring biased and pressure from the front panel 2 urges the retractable flap 12 to displace itself along its pivot axis against the spring bias.

The FIGS. 14 through 19 show another embodiment that is essentially identical to the embodiments described above, except that in this embodiment the rear panel 4 has only half the height of the front panel 2 and the rear panel 4 is substantially placed in front of the front panel 2. The position of the pivot axis that enables the pivoting movement between the panels 2,4 is positioned in accordance with the methods described above. In order to place the rear panel 4 in front of the front panel 2, the rear panel is provided with an arm and 19 that connects to the rear side of the front panel 2.

FIGS. 20 to 25 illustrate another embodiment that is essentially identical to the embodiment described with reference to FIGS. 14 to 19, except that the connection between the front panel and the rear panel is realized with an arm that reaches to into the front panel 2. This arm cannot be seen and is received in a cavity inside the front panel 2.

FIGS. 26 to 31 show another embodiment that is essentially identical to the embodiment illustrated with reference to FIGS. 4 to 7. However, in this embodiment the panels 2,4 are suspended to one another with an additional degree of freedom. The panels 2,4 can in this embodiment also make a sliding movement in the direction of the arrow between FIGS. 27 and 29.

In another embodiment, not shown the panels may be provided with an additional degree of freedom in another direction.

Figure 34:
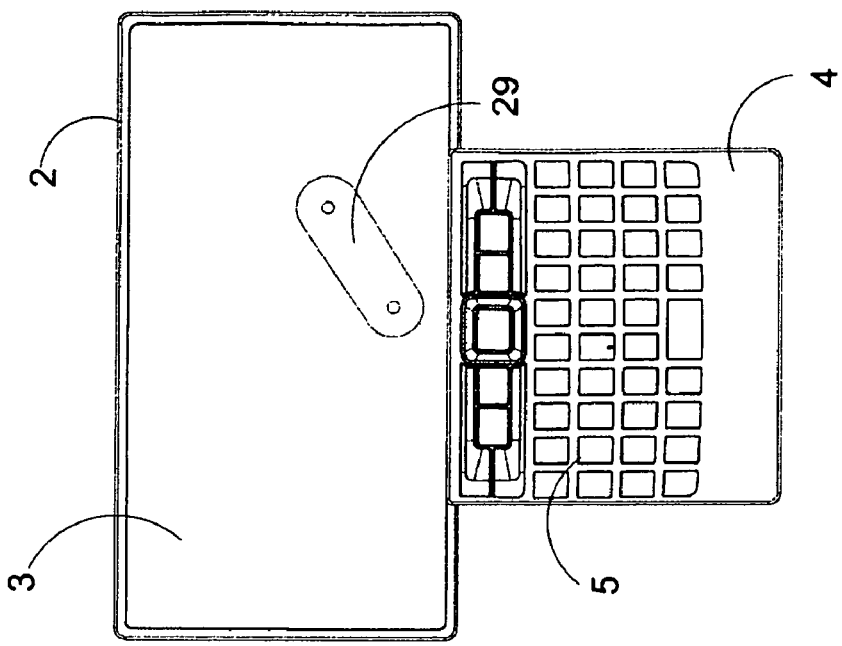
FIG. 34 is a front view of the mobile electronic device shown in FIG. 32 in an extended position.
Figure 33:
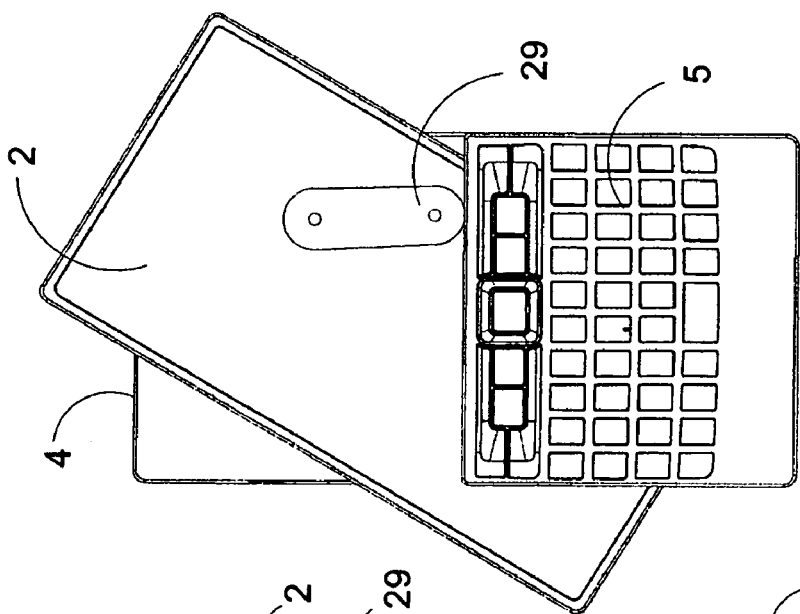
FIG. 33 is a front view of the mobile electronic device shown in FIG. 32 in an intermediate position.
Figure 32:
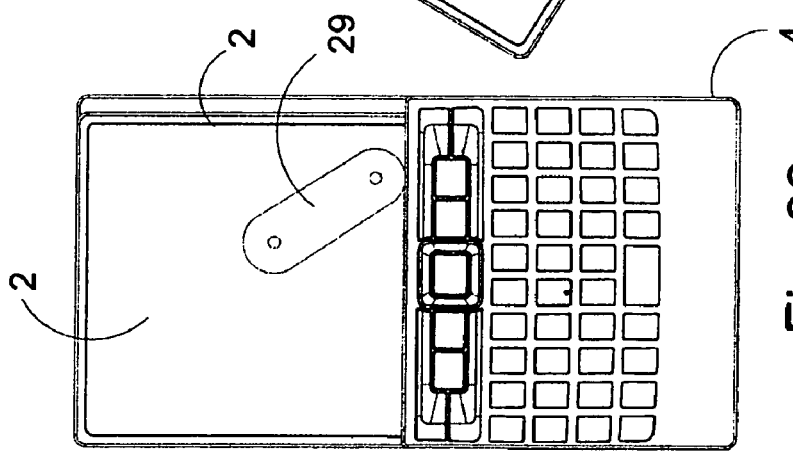
FIG. 32 is a front view of a mobile electronic device according to another embodiment of the invention.

FIGS. 32 through 34 illustrate another embodiment that is essentially identical with the embodiment illustrated with a reference to FIGS. 4 to 7. However, in this embodiment the connection between the panels 2,4 is made by a mechanism including a link arm 29. One end of the link arm 29 is pivotally connected to the front panel 2 whilst the other end of the link arm 29 is pivotally connected to the rear panel 4. The link arm 29 has been made visible in the drawing, but it is of course understood that the link arm is in reality disposed between the panels 2,4 and can therefore not be seen.

FIGS. 35 to 40 illustrate another embodiment that is essentially identical to the embodiment described with reference to FIGS. 14 to 19. However, in this embodiment the rear panel 4 is provided with a further degree of freedom through a swivel 32 that allows the rear panel to swivel relative to the front panel. One face of the rear panel is provided with a QWERTY type keypad 5 whilst the other side of the keypad is provided with mobile phone keypad like the ITU-T keypad 9. Both keypads 5,9 are provided with additional navigation keys, hardkeys and softkeys. The swirling motion of the rear panel 4 allows the user to choose between the two different keypads, in accordance with needs and circumstances. For example for dialing a telephone number or entering numbers it could be advantageous with the mobile phone type keypad 9 whilst the Qwerty type keypad 5 could be advantageous when editing text.

For all the embodiments above, the pivot axis is placed towards the right side of the mobile electronic device, which is ideal for right handed operation. All the embodiments can also be realized in a left handed version with the pivot axis placed towards the left side of the mobile electronic device. In other embodiments the pivot axis placement can be swapped by the user.

In an embodiment (not shown) the first panel is provided with a hinged bearer foot allowing the device to be placed on a table top or the like in the extended position, e.g. for TV use.

The disclosed embodiments have numerous advantages. Different embodiments or implementations may yield one or more of the following advantages. It should be noted that this is not an exhaustive list and there may be other advantages which are not described herein. One advantage of the invention is that it allows for a compact mobile electronic device that is provided with a relatively large landscape display screen. Another advantage of the invention is that it provides for a mobile electronic device in which a portion of the user interface can be selectively covered and uncovered. Yet another advantage of the disclosed embodiments is that it provides for a mobile electronic device with a front panel and a rear panel with outlines that substantially overlap in a compact retracted position and provides for a substantially symmetrical T-shaped outline of the device in an extended position. It is another advantage of the invention that it provides for a mobile electronic device that allows for a display screen to be positioned relative to a keypad in both landscape and portrait orientation. Another advantage of the invention is that it provides for an electronic device on which it is possible to position two different keypads beside a relatively large landscape display screen. It is another advantage of the disclosed embodiments that it provides for a mobile electronic device with two panels wherein one panel can be received at least partially within the other panel in a cavity defined inside one of the panels, whilst said cavity is being protected from ingress of dirt and other undesired material when the other panel is not received inside said cavity. It is another advantage of the invention that it allows elements of the user interface, such as for example a display screen, a keypad, a speaker, a camera, a touchpad or the like to be protected in one position of the panels and to be accessible in another position of the panels. It is another advantage of the invention that it is convenient to hold in the retracted position, for example during touch screen mode, and The term "comprising" as used in the claims does not exclude other elements or steps. The term "a" or "an" as used in the claims does not exclude a plurality.

The reference signs used in the claims shall not be construed as limiting the scope.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon. Moreover, it should be appreciated that those skilled in the art, upon consideration of the present disclosure, may make modifications and/or improvements on the apparatus hereof and yet remain within the scope and spirit hereof as set forth in the following claims.

The invention claimed is:

1. An apparatus comprising:
a housing having at least a first substantially planar panel and a second substantially planar panel,
said first panel having an outline with a width and a height,
said second panel having an outline with a width and a height,
said second panel being arranged adjacent and substantially parallel to said first panel, and said first panel and said second panel are hingeably connected to one another so that the panels can be rotated relative to one another in a plane in which both panels are arranged between a retracted position in which the outline along the width of the first panel substantially coincides with the outline of the width of the second panel, and an extended position that is reached by a substantially 90° rotation of the first panel relative to the second panels, wherein in the extended position, the position of the outline of the first panel along one side of its width substantially coincides with the position of the outline of the second panel along the one side of its height, and wherein a portion of the second panel is a double walled panel with a space there between in which a first portion of the first panel is received and a second portion of the first panel is exposed in the retracted position.

2. The apparatus of claim 1, wherein the outline along one side of the height of the second panel substantially coincides with the outline along the height of the first panel when said panels are in the retracted position.

3. The apparatus of claim 1, wherein there is a ratio of substantially 1:2 between the width and the height of said first panel.

4. The apparatus of claim 1, wherein said panels rotate relative to one another about a pivot axis that is disposed on an imaginary straight line that coincides with a first point in a middle on one side of the outline along the height of the first panel and extends to a corner on another side of the first panel.

5. The apparatus of claim 4, wherein said pivot axis is placed at a distance in the direction of the width of the first panel corresponding to a quarter of the width of the first panel as measured from a side along the width of the first panel, and at a distance in the direction of the height of the first panel corresponding to a quarter of the width of the first panel as measured from an imaginary line extending through the middle of the height of the first panel.

6. The apparatus of claim 1, wherein said first panel has a front face provided with elements of a user interface, and said second panel has a front surface that is provided with elements of a user interface.

7. The apparatus of claim 1, wherein at least a portion of the elements of the user interface on one of the two panels is obscured in the retracted position and wherein said portion of the elements of the user interface is not obscured in the extended position.

8. The apparatus of claim 1, wherein at least one side of said double walled panel is provided with a flap that opens and closes for allowing the portion of the first panel to be received inside that second panel and for closing of the hollow space inside that second panel when said portion of said first panel is not received inside said second panel.

9. The apparatus of claim 8, wherein said flap is urged to its closed position by a spring, preferably a torsion spring.

10. The apparatus of claim 1, wherein said second panel is provided with a QWERTY type keyboard.

11. The apparatus of claim 1, wherein said second panel is also suspended so as to be able to swivel relative to the first panel, so that both sides of the second panel can one at a time act as the front surface of the second panel.

12. The apparatus of claim 11, wherein said second panel is provided on both of its sides with elements of a user interface.

13. The apparatus of claim 12, wherein one side of said second panel is provided with a first type keypad and the other side of said second panel is provided with another type of keypad.

14. The apparatus of claim 1, wherein the first panel is suspended from the second panel by a link mechanism.

15. The apparatus claim 1, wherein said first panel includes a substantially rectangular display screen that makes up the major portion of the front surface of the first panel.

16. The apparatus of claim 15, wherein a portion of the display screen is obscured by the second panel when the panels are in the retracted position.

17. The apparatus of claim 16, wherein the obscured portion of the display screen is deactivated.

18. A method comprising:
providing a pivot axis that connects a first substantially planar panel and a second substantially planar panel of a housing of an apparatus, said first panel having an outline with a width and a height, and said second panel having an outline with a width and a height;
positioning the pivot axis so that the panels can be rotated relative to one another in a plane in which both panels are arranged between a retracted position and an extended position that are separated by a substantially 90° rotation of the first panel relative to the second panel;
further positioning the pivot axis such that the width of the first panel substantially coincides with the width of the second panel in the retracted position, and one side of the first panel is substantially aligned with the top of the second panel in the extended position; and
providing a portion of the second panel with double walls and a space there between for receiving a first portion of the first panel such that a second portion of the first panel is exposed in the retracted position.

19. A method according to claim 18, wherein the outline along the width of the first panel substantially coincides with the outline of the width of the second panel in the retracted position of the panels.

20. A method according to claim 18, further comprising disposing the pivot axis on an imaginary straight line that coincides with a first point in a middle on one side of the outline along the height of the first panel and extends to a corner on another side of the first panel.

21. A method according to claim 18, further comprising placing the pivot axis at a distance in a direction of the width of the first panel corresponding to a quarter of the width of the first panel as measured from a side along the width of the first panel, and at a distance in a direction of the height of the first panel corresponding to a quarter of the width of the first panel as measured from an imaginary line extending through a middle of the height of the first panel.

* * * * *

UNITED STATES PATENT AND TRADEMARK OFFICE
CERTIFICATE OF CORRECTION

PATENT NO. : 7,580,736 B2  Page 1 of 1
APPLICATION NO. : 11/754588
DATED : August 25, 2009
INVENTOR(S) : Ronkko et al.

It is certified that error appears in the above-identified patent and that said Letters Patent is hereby corrected as shown below:

Cover page, Item (75), line 4, delete "Suomusjarvi" and insert --Helsinki-- therefor.

Cover page, Item (73), line 1, delete "FL (US)" and insert --FI-- therefor.

Column 9, line 9, delete "panels" and insert --panel-- therefor.

Column 10, line 11, after "apparatus" insert --of--.

Signed and Sealed this

Sixth Day of July, 2010

David J. Kappos
*Director of the United States Patent and Trademark Office*